US008531468B1

(12) United States Patent
Joshi et al.

(10) Patent No.: US 8,531,468 B1
(45) Date of Patent: *Sep. 10, 2013

(54) IMAGE PROCESSING APPARATUS HAVING CONTEXT MEMORY CONTROLLER

(75) Inventors: Amit Joshi, Haryana (IN); Akash Sood, Haryana (IN); Rakesh Pandey, Delhi (IN)

(73) Assignee: Marvell International Ltd. (BM)

( * ) Notice: Subject to any disclaimer, the term of this patent is extended or adjusted under 35 U.S.C. 154(b) by 0 days.

This patent is subject to a terminal disclaimer.

(21) Appl. No.: 13/618,491

(22) Filed: Sep. 14, 2012

Related U.S. Application Data

(63) Continuation of application No. 13/287,666, filed on Nov. 2, 2011, now Pat. No. 8,294,720, which is a continuation of application No. 11/824,046, filed on Jun. 29, 2007, now Pat. No. 8,111,259.

(60) Provisional application No. 60/818,737, filed on Jul. 6, 2006, provisional application No. 60/822,007, filed on Aug. 10, 2006.

(51) Int. Cl.
*G06F 15/76* (2006.01)
*G06T 15/00* (2011.01)

(52) U.S. Cl.
CPC .................................. *G06T 15/005* (2013.01)
USPC ........... 345/502; 345/522; 345/531; 345/543; 345/613; 345/614; 382/232; 382/238; 382/234

(58) Field of Classification Search
CPC .................................................. G06T 15/005
USPC ................ 382/232, 238, 234; 345/502, 522, 345/531, 543, 613, 614
See application file for complete search history.

(56) References Cited

U.S. PATENT DOCUMENTS

| | | |
|---|---|---|
| 5,659,631 A | 8/1997 | Gormish et al. |
| 5,686,960 A | 11/1997 | Sussman et al. |
| 5,689,589 A | 11/1997 | Gormish et al. |
| 5,736,947 A | 4/1998 | Imanaka |
| 6,085,028 A | 7/2000 | Takagi et al. |
| 6,181,438 B1 | 1/2001 | Bracco et al. |
| 6,282,321 B1 | 8/2001 | Kim |
| 6,285,790 B1 | 9/2001 | Schwartz |
| 6,643,030 B1 | 11/2003 | Lace et al. |
| 6,701,380 B2 | 3/2004 | Schneider et al. |
| 6,748,020 B1 | 6/2004 | Eifrig et al. |
| 6,832,005 B2 | 12/2004 | Malvar |
| 6,990,242 B2 | 1/2006 | Malvar |
| 7,139,435 B2 | 11/2006 | Malvar |
| 7,433,522 B2 | 10/2008 | Chang et al. |
| 7,577,300 B2 | 8/2009 | Hirao |

(Continued)

*Primary Examiner* — Javid A Amini

(57) ABSTRACT

An apparatus for use in image processing is set forth that comprises a pixel processor, context memory, and a context memory controller. The pixel processor is adapted to execute a pixel processing operation on a target pixel using a context of the target pixel. The context memory is adapted to store context values associated with the target pixel. The context memory controller may be adapted to control communication of context values between the pixel processor and the context memory. Further, the context memory controller may be responsive to a context initialization signal or the like provided by the pixel processor to initialize the content of the context memory to a known state, even before the pixel processor has completed its image processing operations and/or immediately after completion of its image processing operations. In one embodiment, the pixel processor executes a JBIG coding operation on the target pixel.

20 Claims, 5 Drawing Sheets

(56) References Cited

U.S. PATENT DOCUMENTS

| | | | |
|---|---|---|---|
| 7,814,486 B2 | 10/2010 | Papakipos et al. | |
| 8,111,259 B1 * | 2/2012 | Joshi et al. | 345/502 |
| 8,294,720 B2 * | 10/2012 | Joshi et al. | 345/502 |
| 2004/0052422 A1 | 3/2004 | Ueda | |
| 2005/0275760 A1 | 12/2005 | Gritz et al. | |
| 2006/0059494 A1 | 3/2006 | Wexler et al. | |
| 2006/0079214 A1 | 4/2006 | Mertama et al. | |
| 2006/0083436 A1 | 4/2006 | Malvar | |
| 2006/0233444 A1 | 10/2006 | Chang et al. | |
| 2007/0019005 A1 | 1/2007 | van Baarsen et al. | |
| 2007/0038939 A1 | 2/2007 | Challen et al. | |
| 2007/0101108 A1 | 5/2007 | Grossman et al. | |
| 2007/0291044 A1 | 12/2007 | Xu et al. | |
| 2008/0055325 A1 | 3/2008 | Seigneret et al. | |
| 2008/0056377 A1 | 3/2008 | Selorio et al. | |
| 2009/0147017 A1 | 6/2009 | Jiao | |

* cited by examiner

IMAGE PROCESSING APPARATUS HAVING CONTEXT MEMORY CONTROLLER

CROSS-REFERENCE TO RELATED APPLICATION

This application is a continuation of U.S. application Ser. No. 13/287,666, filed Nov. 2, 2011, which is a continuation of U.S. application Ser. No. 11/824,046, filed Jun. 29, 2007, which claims the benefit of U.S. Provisional Application No. 60/818,737, filed Jul. 6, 2006, and of U.S. Provisional Application No. 60/822,007, filed Aug. 10, 2006, all of which are hereby incorporated by reference.

BACKGROUND

Image processing apparatus have been widely used in a variety of different applications. Such applications include, but are not limited to, printing, facsimile transmission/reception, medical imaging, video transmission/reception, and the like. In each instance, various ways of handling the data corresponding to the image have been devised. To this end, the image data may be encoded and/or decoded in accordance with one or more compression and/or decompression operations.

Entropy encoding/decoding may be used when lossless compression/decompression is needed. Different types of entropy encoding/decoding have been standardized for use in image processing apparatus. JBIG and JBIG2 are industry standards that are in common use. JBIG employs a form of entropy encoding/decoding known as arithmetic encoding/decoding. Compression methods that use arithmetic coding start by determining a model of the data. The model constitutes a prediction of what patterns will be found in pixels forming the image. Sophisticated models may be used in the arithmetic coding process. In these sophisticated models, higher-order modeling may be employed. In accordance with this higher-order modeling, the model used for the currently targeted pixel changes its estimation of the current probability of a pixel based on one or more pixels that precede it. The various pixels that are used to change the model for use in predicting the value of the target pixel is known as a context. Similarly, a context is generated and used in the decoding of a target pixel.

Image processing systems that employ a context for encoding and/or decoding image data may include memory storage that is specifically dedicated to storing context data. The context memory storage is cleared to an initial state upon completion of the encoding and/or decoding operations in preparation for processing a subsequent image. Clearing of the context memory is typically executed by a central processing unit that controls the whole apparatus. Alternatively, a codec may begin initializing the context memory storage after a command to process an image is received but before the codec begins actual processing of the image data. As such, the clearing of the context memory substantially increases the latency of the processing executed by the whole apparatus. As the throughput demands on image processing apparatus increase, new approaches to decreasing the latency of the image processing apparatus are desirable.

SUMMARY

The present invention is defined by the following claims, and nothing in this section should be taken as a limitation on those claims. By way of introduction, the embodiments described below provide an apparatus for use in image processing. The apparatus comprises a pixel processor, context memory, and a context memory controller. The pixel processor is adapted to execute a pixel processing operation on a target pixel using a context of the target pixel. The context memory is adapted to store context values associated with the target pixel. The context memory controller may be adapted to control communication of context values between the pixel processor and the context memory. Further, the context memory controller may be responsive to a context initialization signal or the like provided by the pixel processor to initialize the content of the context memory to a known state, even before the pixel processor has completed its image processing operations and/or immediately after completion of the image processing operations. In one embodiment, the pixel processor executes a JBIG coding operation on the target pixel.

The embodiments will now be described with reference to the attached drawings.

DETAILED DESCRIPTION OF THE PRESENTLY

Preferred Embodiments

Figure 1:
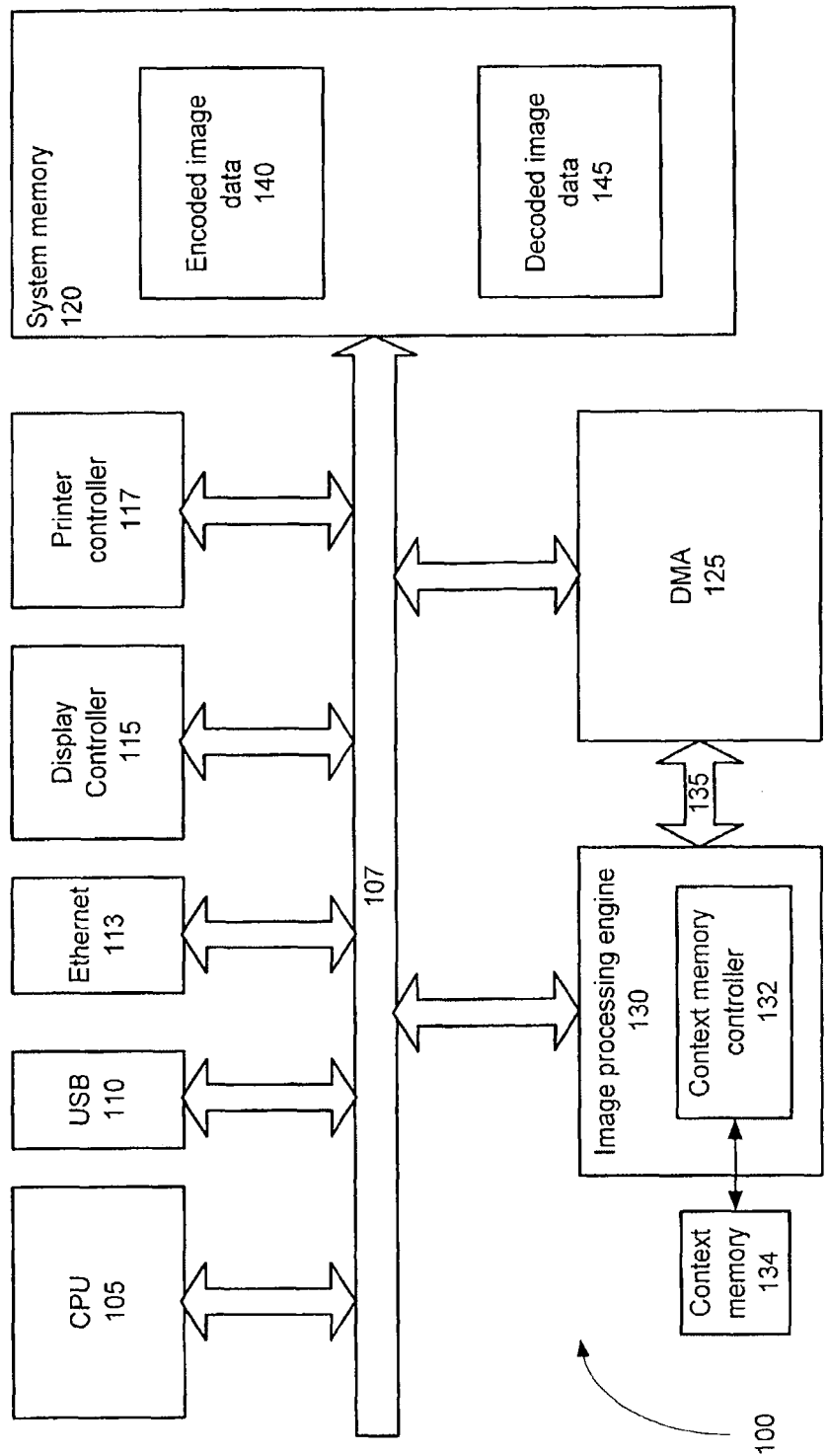
FIG. 1 is a schematic block diagram of an exemplary image processing system that may employ an image processing engine constructed in accordance with one embodiment of the invention.

FIG. 1 is a block diagram of a microprocessor-based system 100 that may be used for image processing. System 100 employs a plurality of components that are interconnected with a processor or central processing unit (CPU) 105 over a system bus 107. Depending on the system requirements, the components may include a USB interface 110, an Ethernet interface 113, a display controller 115, a printer controller 117, and system memory 120. System memory 120 may include read only memory as well as random access memory storage. System 100 may also include one or more I/O devices such as a disk drive (floppy, optical, hard disk, etc.), one or more human interface devices, one or more sensors, or the like. For the sake of simplicity, these and other components that may be used in the operation of the system 100 have not been included in FIG. 1.

System 100 also includes a DMA controller 125 that is in communication with an image processing engine 130 over a process bus 135. Image processing engine 130 may be constructed to execute an image encoding operation, an image decoding operation, or both (codec). The specific type of encoding and/or decoding operation may vary, but the illustrated system 100 employs an encoding and/or decoding operation that uses the context of a target pixel in the encoding and/or decoding operation. To this end, the image processing engine 130 includes a context memory controller 132 that is connected to access and, optionally, control a context memory 134.

The processor 105 executes code that, for example, is stored in system memory 120. This code includes routines that may be executed to program the DMA controller 125 for data transfer operations. Additionally, the code may include routines that are executed to program the operation of the image processing engine 130. In the illustrated system, the DMA controller 125 may be programmed to execute data transactions in which data is transferred to and from system memory 120 over system bus 107. More particularly, the DMA controller 125 may access data in an encoded image data section 140 of system memory 120 as well as data in a decoded image data section 145 of system memory 120. The image data stored in sections 140 and 145 may be transferred to and from the image processing engine 130 over, for example, the dedicated process bus 135 using the DMA controller 125.

In the illustrated system 100, image data may be provided through, for example, USB interface 110 and/or Ethernet interface 113. Interfaces 110 and/or 113 may be connected to a scanner, external storage device, or the like, that provides image data. The received data may be stored in the encoded image data section 140 if the image processing engine 130 is to decode the received data, and may be stored in the decoded image data section 145 if the image processing engine 130 is to encode the received data.

In operation, DMA controller 125 shuttles small portions of the data from either the encoded image data section 140 or the decoded image data section 145 to the image processing engine 130 over process bus 135. For example, in a decoding operation, DMA controller 125 may shuttle an amount of data corresponding to a single pixel of the image from the encoded image data section 140 to the image processing engine 130. As each pixel of the image stored in the encoded image data section 140 is processed, the resulting decoded pixel is shuttled by DMA controller 125 from the image processing engine 130 to the decoded image data section 145. As further pixels are processed, the image processing engine 130 generates a context for the pixel decoding operations. The data representing the generated context is stored in context memory 134, which may be accessed by the context memory controller 132 or directly by another portion of the image processing engine 130. In the illustrated embodiment, the context memory controller 132 is formed as part of the image processing engine 130 and may be used to control the flow of context values between the context memory 134 and other portions of the image processing engine 130. However, the context memory controller 132 may be formed as a separate component whose sole operation is directed to initialization of the context memory 134 to a known state.

Upon completion of various image processing tasks executed by the image processing engine 130, the data in context memory 134 may no longer be valid for subsequent encoding and/or decoding operations. In prior systems, the context memory would be initialized to all zeroes through write operations executed by the processor 105. Such clearing of the context memory requires the processor 105 to execute a write operation to each context memory location, which may substantially increase the overall latency of the image processing system 100. In other instances, prior systems have included codecs that execute context initialization operations after the codec has received a command from the CPU 105 to begin processing an image. Both manners of context initialization require extra context initialization time adding to the processing latency associated with each image.

In contrast, context memory controller 132 is adapted to respond to a context initialization signal generated by, for example, the image processing engine 130 to automatically initialize the content of the context memory 134. As such, context memory initialization operation may be executed while other portions of the image processing engine 130 are processing the image and/or a particular target pixel of the image. In this manner, initialization of the context memory 134 may be substantially completed before the image processing engine 130 is requested to process a subsequent image. Alternatively, or in addition, the context memory controller 132 may be directed to begin context memory initialization immediately after the image processing engine 130 has substantially completed its image processing operations thereby reducing context memory initialization latency.

Figure 2:
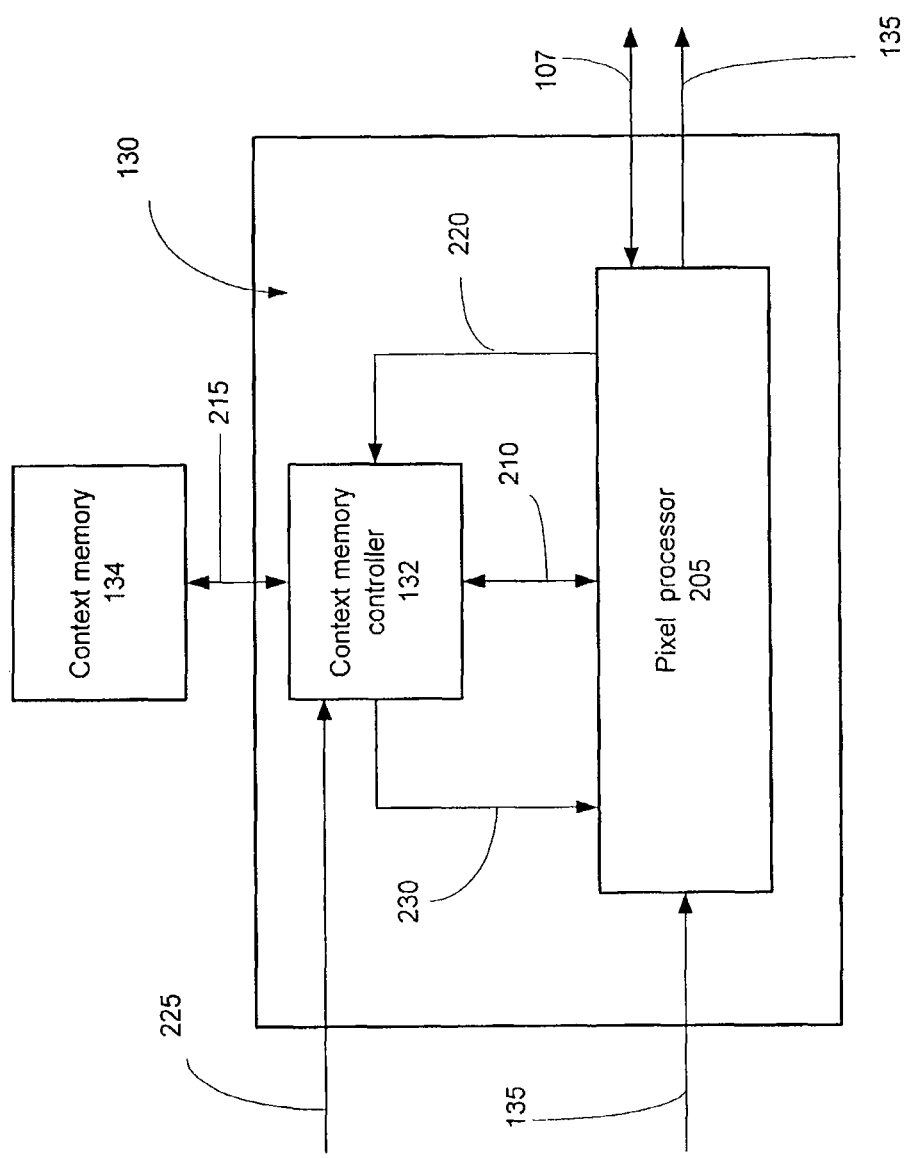
FIG. 2 is a schematic block diagram of one manner of implementing an image processing engine that may be used in the image processing system of FIG. 1.

FIG. 2 is a schematic block diagram of one manner of implementing the image processing engine 130 to reduce such latency. In this embodiment, the image processing engine 130 includes a pixel processor 205 that is connected to receive pixel data for processing and return processed pixel data over process bus 135. The pixel processor 205 executes encoding and/or decoding operations in accordance with a standard or proprietary image compression format that uses the context of a target pixel for the encoding and/or decoding operation. Such standards include entropy coding techniques, arithmetic coding techniques, and the like. The JBIG standard is one such technique.

The context memory controller 132 of this embodiment is used to control the communication of context values between the pixel processor 205 and context memory 134. To this end, one or more communication lines 210 are provided between the context memory controller 132 and the pixel processor 205. Additionally, one or more communication/control lines 215 are provided between the context memory controller 132 and the context memory 134, which allow the context memory controller 132 to read data from and write data to the context memory 134. Context memory 134 may be implemented using dual port memory to give the context memory controller 132 the ability to concurrently read from and write to context memory 134 in a single clock cycle.

At some time during the operation of the pixel processor 205, the pixel processor 205 may determine that the data in context memory 134 is no longer useful for subsequent encoding and/or decoding operations. At that time, the pixel processor 205 may communicate this fact to the context memory controller 132 over one or more signal lines 220. In response to this indication, context memory controller 132 may begin initializing the values of the memory locations of context memory 134 to a known state, such as all zeroes, thereby relieving processor 105 of this duty.

The manner in which the pixel processor 205 makes the determination that the context memory data is no longer useful and communicates this to the context memory controller 132 may be implemented in a number of different manners. For example, the indication may be provided after the coding of the last pixel of the image but before the last pixel has been stuffed and/or packed and provided for output on process bus 135. Under these circumstances, latency may be substantially reduced since context memory clearing may be complete or near completion by the time that the pixel processor 205 interrupts processor 105 along bus 107 that the processing of the image has been completed. The image processing engine 130 is therefore ready or near ready to process a subsequent image when requested by the processor 105.

Other times for making this determination and providing the corresponding indication may be used as well. For example, pixel processor 205 may be implemented to provide the indication along signal line(s) 220 after all pixels of the image have been processed or at some intermediate time occurring after a specified subset of the pixels of the image have been processed.

The context memory controller 132 may also be adapted to respond to hard and/or soft reset signals provided at one or more lines 225. When either or both a hard and/or soft reset signal is asserted, the context memory controller 132 automatically begins clearing context memory 134 and initializing its memory location content to a known state.

There may be times when the context memory controller 132 cannot respond to requests from the pixel processor 205. Accordingly, the context memory controller 132 may indicate whether it is ready to accommodate requests from the pixel processor 205 using one or more signals. Requests for access to the context memory 134 by the pixel processor 205 may be inhibited until the state of the signal(s) 230 indicates that the context memory controller 132 is ready to accommodate the requests.

Figure 3:
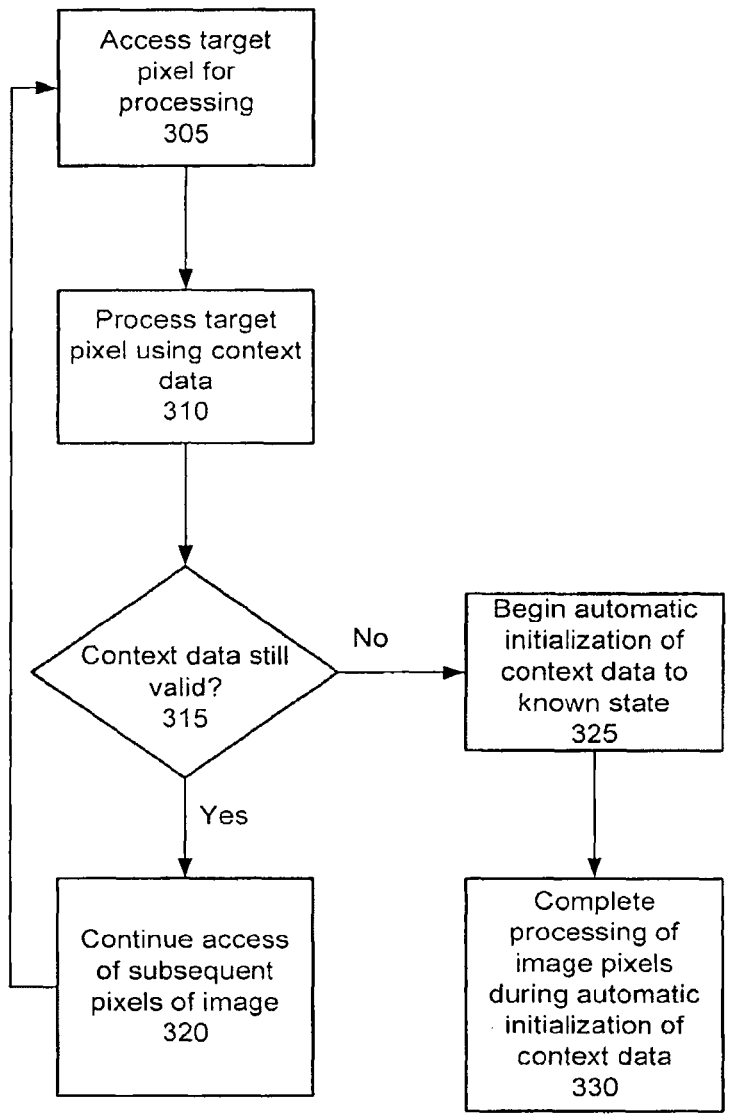
FIG. 3 is a flow chart showing a plurality of interrelated operations that may be used in the implementation of the image processing system shown in FIG. 1.

FIG. 3 is a flow chart showing a plurality of interrelated operations that may be used in the image processing system 100 shown in FIG. 1. In this example, a target pixel is accessed for processing at block 305. The target pixel is processed using context data, if available, at block 310. At block 315, a check is made to determine whether the context data is still valid for use in processing subsequent pixels. If the context data is still valid, image processing is continued at block 320 through, for example, the continued access of subsequent pixels of the image. As each new pixel is accessed, control may be returned to the operation at block 305.

If the context data is no longer valid, and operation is begun at block 325 to automatically initialize the context data to a known state. As the context data is automatically initialized to the known state, the remaining operations required to complete processing of the image may be executed at block 330. In this example, image processing operations for an image may be completed while the context data is initialized thereby reducing the amount of time before the system 100 is ready to process a subsequent image.

Figure 4:
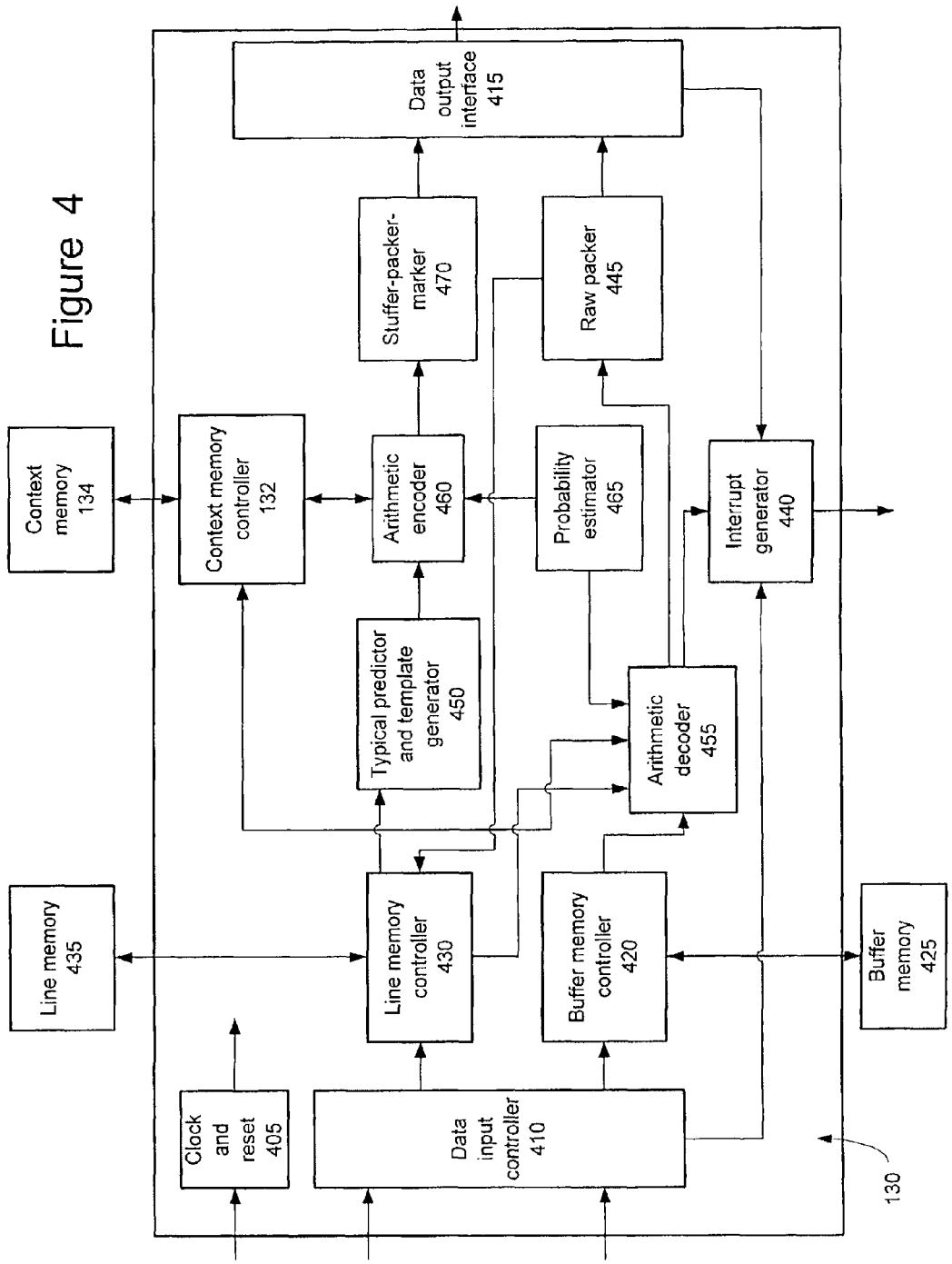
FIG. 4 is a schematic block diagram illustrating one manner of implementing an image processing engine that is capable of processing an image in accordance with a JBIG standard.

FIG. 4 is a schematic block diagram showing an image processing engine 130 that may be used in the system 100 shown in FIG. 1. In this embodiment, the image processing engine 130 is implemented as a configurable JBIG codec. Architecture optimization in this embodiment may be achieved by splitting the functionality into separate encoder and decoder units. Encoder only and decoder only configurations may be used in applications that need only encoding or only decoding. A codec configuration may be used in applications that need both encoding and decoding but don't need them at the same time. In the codec configuration, the encoder and decoder sections can share context and line memories and some other logic. The image processing engine 130 decompresses or compresses data according to the JBIG ITU-T T.82 standard, and outputs a pixel bitmap for decode, or compressed image for encode.

As shown in FIG. 4, the processing engine 130 interfaces with a number of different components. To this end, the processing engine 130 includes a clock and reset circuit 405 for interfacing with clock and reset signals, a data input controller 410 for interfacing with data input signals, a data output interface 415 for providing data output signals, a buffer memory controller 420 for interfacing with buffer memory storage 425, a line memory controller 430 for interfacing with line memory storage 435, and a context memory controller 132 for interfacing with context memory 134. Exemplary signals that may be used to implement these various interfaces are shown in TABLE 1 below.

TABLE 1

| Signal Name | Number | Dir | Description |
|---|---|---|---|
| Clock and reset | | | |
| clk | 1 | I | Master clock for JBIG block. |
| reset_n | 1 | I | Active low reset input. JBIG core synchronously resets on this signal going active. |
| soft_reset_n_i | 1 | I | Active low reset input. JBIG core synchronously resets on this signal going active. |
| Data input interface | | | |
| data_in_i | 16 | I | Uncompressed/Compressed data input. |
| data_in_irdy_i | 1 | I | Data initiator ready. This signal qualifies the data availability at the input interface. |
| data_in_trdy_o | 1 | O | Data target ready. This signal qualifies the readiness of the image processing engine 130 to accept the input data. |
| Data output interface | | | |
| data_out_o | 16 | O | Uncompressed/Compressed data output. |
| data_out_ack_o | 1 | O | Data acknowledge. This signal qualifies the data availability at the output interface. |
| data_out_req_i | 1 | I | Data request. This signal indicates the outside logic's request of data from the image processing engine 130. |
| Buffer memory interface | | | |
| buff_mem_data_o | 16 | O | Data output to dual_ported buffer memory. |
| buff_mem_data_i | 16 | I | Data input from dual_ported buffer memory. |
| buff_mem_wr_o | 1 | O | Write control signal for buffer memory. |
| buff_mem_rd_o | 1 | O | Read control signal for buffer memory. |
| buff_mem_wr_add_o | * | O | Write port address for buffer memory. |
| buff_mem_rd_add_o | * | O | Read port address for buffer memory. |
| Line memory interface | | | |
| line_mem_data_o | 16 | O | Data output to dual_ported line memory. |
| line_mem_data_i | 16 | I | Data input from dual ported line memory. |
| line_mem_wr_o | 1 | O | Write control signal for line memory. |
| line_mem_rd_o | 1 | O | Read control signal for line memory. |
| line_mem_wr_add_o | * | O | Write port address for line memory. |
| line_mem_rd_add_o | * | O | Read port address for line memory. |
| Context memory interface | | | |
| cntx_mem_data_o | 8 | O | Data output to dual_ported context memory. |
| cntx_mem_data_i | 8 | I | Data input from dual_ported context memory. |
| cntx_mem_wr_o | 1 | O | Write control signal for context memory. |
| cntx_mem_rd_o | 1 | O | Read control signal for context memory. |

TABLE 1-continued

| Signal Name | Number | Dir | Description |
|---|---|---|---|
| cntx_mem_wr_add_o | 10 | O | Write port address for context memory. |
| cntx_mem_rd_add_o | 10 | O | Read port address for context memory. |

The data input controller 410 is responsible for controlling data input through the data input interface. Data input controller 410 may operate to count the end-of-stripe markers during decoding operations and the total number of pixels during encoding operations to decide when it has to stop taking data from the data input interface. End of input data for encode is detected by counting data transfers and for decode by counting end-of-stripe markers. Data is diverted to the line memory 435 for an encode operation and to buffer memory 425 for a decode operation. The interface between data input controller 410, buffer memory controller 420, and line memory controller 430 may follow the irdy/trdy protocol. The data input controller 410 may also be used to receive and condition status and control bits used by the image processing engine 130.

The data input controller 410 may provide an interrupt pulse to an interrupt generator 440 for decoder operations, if the input data size reaches the uncompressed image size, but an end-of-stripe has not yet been encountered. Data may be received beyond that point as it is an error condition and the system expects to be restarted afterwards.

The line memory controller 430 is responsible for controlling the line memory 435 and for writing incoming data and reading data to be supplied to subsequent processing blocks. Line memory 435 may be implemented using dual port memory. The line memory depth may be scalable.

For codec configurations, the write-data to line-memory comes from data input controller 410 or a raw packer circuit 445 based on whether the image processing engine 130 is executing an encoding or decoding operation, respectively. The read-data from the line memory 435 goes to a typical predictor and template generator 450 or arithmetic decoder 455 based on whether the image processing engine 130 is executing an encoding operation or decoding operation, respectively. Read interfaces for both these blocks are similar but are different from write interfaces. In JBIG encoding and decoding, pixel references are made between 4 lines (max). To facilitate this, the read interfaces provide the facility to read a 16 bit word for a line (0, 1, 2, 3). Provision is given for "read", "read and clear", and "clear line" operations. The read interfaces may use a req/ack type protocol for all operations.

In an encoder configuration, the write-data to the line memory 435 comes from the data input controller 410 and read-data goes to the typical predictor and template generator 450. The rest of the operations associated with the line memory 435 may be executed in the same manner as in codec configuration.

In a decoder configuration, the data may be read from the line memory 435 by the typical predictor and template generator 450 and the arithmetic decoder 455 using a req/ack protocol. Data may be written by the raw packer 445 using an irdy/trdy interface. The rest of the operations associated with the line memory 435 may be executed in the same manner as in the codec configuration.

The buffer memory controller 420 is responsible for controlling the buffer memory 425 and for writing incoming compressed data and reading data to be supplied to subsequent processing blocks. The buffer memory 425 may be implemented using dual port memory and may be used to store a compressed image when the arithmetic decoder 455 is not ready to consume the data. The buffer memory depth may be scalable and can be scaled down to 1 or even 0. The buffer memory 425 is not necessary in encoding operations.

In a decoder configuration, the data of the buffer memory 425 is written through the input data controller 410 using, for example, an irdy/trdy interface protocol. Similarly, read operations by the arithmetic decoder 455 from the buffer memory 425 may be executed using an irdy/trdy interface protocol.

The typical predictor and template generator 450 is responsible for doing line prediction and template generation in the encoder data-path. In a codec configuration, the typical predictor and template generator 450 generates the templates for the given configuration and typical prediction mode. Templates are generated based on lines of the image fetched from the line memory controller 430. The generated templates along with start of frame, end of frame, start of stripe, end of stripe and the pixel value are passed onto an arithmetic encoder 464 for use in encoding the target pixel. These values may be passed to the typical predictor and template generator 450 using, for example, and irdy/trdy handshake interface. In one embodiment, the value of the target pixel (TPVALUE) may be dropped from the interface by only providing code worthy pixels to the typical predictor and template generator 450. As such, if typical prediction is enabled and a line matches, only a pseudo pixel is sent for coding thereby providing a shorter encoding time.

The context memory controller 132 is responsible for controlling the dual ported context memory 134 as well as for updating and supplying contexts to the arithmetic encoder 460 and arithmetic decoder 455. The size of the context memory 132 may be fixed to 1024 locations i.e. 10 bit address.

In a codec configuration, there are two sets of ports available at the context memory controller 132, one each for the arithmetic encoder 460 and arithmetic decoder 455. The two sets of ports may be identical and comprise template, data, read, write and controller ready signals.

The operation of the context memory controller 132 is described above in connection with FIG. 2. Once the context clearing is completed, a controller ready signal is asserted. The arithmetic encoder 460 and arithmetic decoder 455 look for this controller ready signal before starting to engage the context memory controller 132. Context clearing also may be executed once the operation is over i.e. the image is compressed or decompressed.

In an encoder configuration, only the port connected to the arithmetic encoder 460 is employed. Similarly, only the port connected to the arithmetic decoder 455 is employed in a decoder configuration. The rest of the operation remain the same as in the codec configuration.

The probability estimator 465 is responsible for providing LSZ, NLPS, NMPS and SWTCH values based on the input value of ST provided by the arithmetic decoder 455 or arithmetic encoder 460. These signals have assigned functions in the JBIG protocol.

In a codec configuration, the probability estimator 465 includes two sets of ports, one each for the arithmetic encoder 460 and arithmetic decoder 455. The two sets of ports may be identical and may comprise a state signal (ST) and data signals (LSZ, NLPS, NMPS and SWTCH). In the encoder configuration, only the port that connects to the arithmetic encoder 460 is employed. Similarly, only the port that connects to the arithmetic decoder 455 is employed in the decoder configuration.

The arithmetic encoder 460 executes the arithmetic encoding operations to encode the pixels of an image. Arithmetic encoder 460 gets template, TPVALUE and PIX values along with end_of_stripe and end_of_frame indications from typical predictor and template generator 450. Further, arithmetic encoder 460 interacts with the context memory controller 132 for reading and updating the context data in context memory 134, and with the probability estimator 465 for getting probabilistic values of LSZ, NLPS, NMPS and SWTCH, signals that have particularized meanings in connection with the JBIG protocol. Still further, arithmetic encoder 460 may be used to generate an SCD byte stream with end_of_stripe and end_of_frame indications to a stuffer-packer-marker circuit 470 using, for example, and irdy/trdy type interface. This block removes all the lagging zeros generated during FLUSH, at the end of a stripe. All zeros generated before will be transmitted to the stufffer-packer-marker circuit 470.

The stuffer-packer-marker circuit 470 receives the SCD byte stream from the arithmetic encoder 460 to generate a PSCD byte stream to the data output interface 415. It also gets stripe and frame markers (end_of_stripe and end_of_frame) and puts the required markers (ATMOV, end of stripe) and end_of_frame indication in the output stream. In one embodiment, circuit 470 frames the output in 16-bit wide chunks. The stuffer-packer-marker circuit 470 also may be used to remove the first valid SCD generated by the arithmetic encoder 460.

The data output interface 415 is responsible for data output to external components and for interrupt generation, such as image encoding done and/or image decoding done on successful operation completion. Data output interface 415 receives data from the stuffer-packer-marker circuit 470 during encoding operations and/or data from the raw packer 445 during decoding operations. Data communications may be executed using an irdy/trdy interface protocol. The data output interface 415 may assemble the data in 16 bit for provision to the external components. An interrupt pulse may be supplied to interrupt generator 440 when the last word is accepted by the external components to indicate successful completion of an encoding and/or decoding operation.

The arithmetic decoder 455 executes a number of different operations including byte destuffing, template formation, line prediction and arithmetic decoding of the incoming pixel stream. It has many sub-blocks with interwoven functionalities.

The arithmetic decoder 455 begins a decoding process by reading data from the buffer memory 425. It then executes marker extraction and destuffing on the input data. For ATMOV markers, the ATMOV horizontal value is extracted for use in template creation on a stripe-by-stripe basis. For any of the marker related errors (Invalid escape code, Non-zero YAT, ATMOV horizontal value out of range, Y direction ATMOV, Newlength marker, Comment marker, Reserved marker, SDRST marker and abort marker) a one clock pulse is sent to the interrupt generator 440. Separate pulses may be used to indicate each error condition. The line memory 435 is read to create a template, which in turn is used as the address to access (read and write) the context memory 134. Eventually, the data read from the context memory 134 is used to read the probability estimation table as per the JBIG decode algorithm. As such, the decoded pixels are output to the raw packer 445 using, for example, an irdy/trdy interface.

The raw packer 445 collates decoded pixels received from the arithmetic decoder 455. It may gather 16 pixels before writing that information into line memory 435. It may also be used to send that 16 bit information with an end_of_frame indication out to the data output interface 415. Back pressure experience by the raw packer 445 from the data output interface 415 and/or line memory controller 430 is reflected at the data input controller 410.

The interrupt generator 440 receives all the interrupt event pulses generated by various blocks as mentioned earlier. The interrupt generator may generate a single interrupt signal at its output or multiple interrupt signals representing specific interrupt conditions. When a single interrupt signal is employed, the interrupt generator 440 may include a condition register that may be read by the processor 105 to identify the source of the interrupt.

Figure 5:
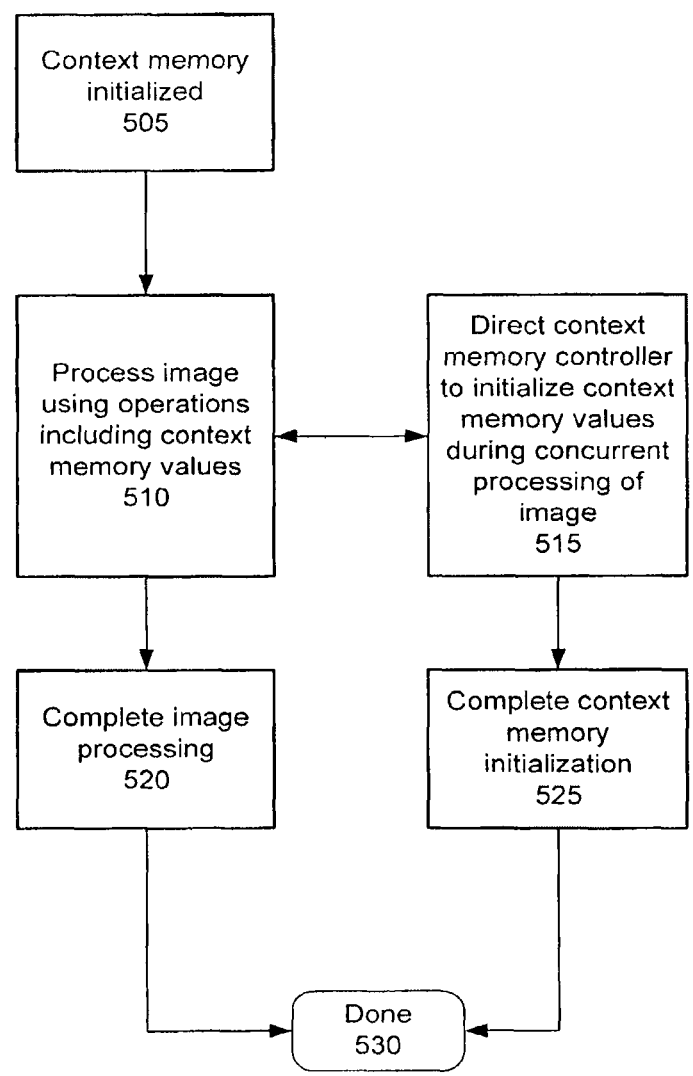
FIG. 5 is a flowchart showing a plurality of interrelated operations that may be used in the implementation of the image processing system shown in FIGS. 1 and 2.

FIG. 5 is a flowchart showing a plurality of interrelated operations that may be used in the implementation of the image processing system shown in FIGS. 1 and 2. In the illustrated operations, image processing may begin with the context memory 134 initialized at block 505. Initialization may have occurred, for example, during and/or immediately after processing of a prior image. At block 510, an image is processed using operations that include values stored in the context memory 134. The context memory controller 132 is directed at block 515 to initialize context memory values. This direction may be given immediately after substantial completion of the image processing operations at block 510 and/or during concurrent processing of the image at block 510. At block 520, the image processing has been completed. Similarly, the context memory initialization operation is completed at block 525. Block 530 corresponds to completion of all image processing operations and may correspond to a state in which the system 100 is ready to process another image.

It is intended that the foregoing detailed description be understood as an illustration of selected forms that the invention can take and not as a definition of the invention. It is only the following claims, including all equivalents, that are intended to define the scope of this invention.

What is claimed is:

1. A memory controller of an image processing system, the memory controller configured to operate with a pixel processor and a context memory, the pixel processor is configured to read and write context values from and to the context memory, the memory controller comprising:
   a context initialization input configured to receive a context initialization signal from the pixel processor that is configured to determine whether a context of a target pixel of an image is valid and to process the target pixel using the context of the target pixel if the context is valid; and
   an output section configured to write values to the context memory associated with the context of the target pixel;
   wherein in response to receipt of the context initialization signal, the memory controller is configured to initialize memory locations of the context memory to an initialization state,
   wherein the context initialization signal is received at the context initialization input when the pixel processor determines that the one or more context values are not valid,
   wherein the initialization state corresponds to a context memory state that enables the pixel processor to begin encoding or decoding operations of a new image, and
   wherein the memory controller is configured to initialize the context memory at least partly simultaneously while the pixel processor performs other encoding or decoding operations.

2. The memory controller of claim 1, wherein the memory controller is configured to control communication of the context values between the pixel processor and the context memory.

3. The memory controller of claim 1, wherein the context initialization signal is received in response to the pixel processor completing processing of all pixels of the image.

4. The memory controller of claim 1, wherein the memory controller is configured to initialize the context memory at least partly simultaneously while the pixel processor processes other portions of the image.

5. The memory controller of claim 1, wherein the context memory comprises a dual port memory.

6. The memory controller of claim 1, wherein the memory controller is further configured to read from and write to the context memory in a single clock cycle.

7. The memory controller of claim 1, wherein the memory controller is further configured to receive a reset signal.

8. A method for operating a memory controller of an image processing system, the memory controller configured to operate with a pixel processor and a context memory, the pixel processor is configured to read and write the context values from and to the context memory, the method comprising:
   receiving a context initialization signal from a pixel processor configured to process an image based at least in part on one or more context values associated with a target pixel of the image, wherein the pixel processor communicates the context initialization signal prior to completing processing of the image; and
   initializing the one or more context values to an initialization state in response to the context initialization signal, wherein the initialization state corresponds to a context value state that enables the pixel processor to begin encoding or decoding operations of a new image, wherein initializing of the one or more context values occurs while the pixel processor performs other encoding or decoding operations.

9. The method of claim 8, further comprising controlling communication of the context values between the pixel processor and the context memory.

10. The method of claim 8, wherein the context initialization signal is received in response to the pixel processor completing processing of all pixels of the image.

11. The method of claim 8, wherein the other encoding or decoding operations are performed on other portions of the image.

12. The method of claim 8, wherein the context memory comprises a dual port memory.

13. The method of claim 8, further comprising reading from and writing to the context memory in a single clock cycle.

14. The method of claim 8, further comprising receiving a reset signal.

15. An apparatus for use in image processing comprising:
   a context memory adapted to store one or more context values associated with a target pixel of an image;
   a pixel processor adapted to determine whether a context of the target pixel is valid, to process the target pixel using the context of the target pixel if it is determined that the context is valid, and to generate a context initialization signal if it is determined that the context value is not valid; and
   a context memory controller adapted to initialize memory locations of the context memory to an initialization state in response to receipt of the context initialization signal,
   wherein the initialization state corresponds to a context memory state that enables the pixel processor to begin encoding or decoding operations of a new image,
   wherein the pixel processor is configured to perform other encoding or decoding operations while the context memory controller initializes the context memory, and
   wherein the pixel processor is configured to read and write the context values from and to the context memory.

16. The apparatus of claim 15, where the pixel processor is adapted to execute a JBIG coding operation on the target pixel.

17. The apparatus of claim 15, where the pixel processor is configured to generate the context initialization signal in response to the pixel processor determining that the pixel processor has completed processing all pixels of an image.

18. The apparatus of claim 15, where the context memory controller is configured to initialize the memory locations of the context memory while the pixel processor processes other portions of the image.

19. The apparatus of claim 15, where the context memory comprises dual port memory.

20. The apparatus of claim 15, where the pixel processor comprises an arithmetic encoder and an arithmetic decoder, and is adapted to execute both encoding and decoding operations, and to execute an entropy coding operation on the target pixel.

* * * * *